United States Patent
Nagao (10) Patent No.: US 9,051,121 B2
(45) Date of Patent: Jun. 9, 2015

(54) MEDIUM CONVEYANCE MECHANISM

(75) Inventor: Junpei Nagao, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 89 days.

(21) Appl. No.: 13/991,160

(22) PCT Filed: Dec. 5, 2011

(86) PCT No.: PCT/JP2011/078101
§ 371 (c)(1),
(2), (4) Date: May 31, 2013

(87) PCT Pub. No.: WO2012/114599
PCT Pub. Date: Aug. 30, 2012

(65) Prior Publication Data
US 2013/0248332 A1    Sep. 26, 2013

(30) Foreign Application Priority Data
Feb. 21, 2011  (JP) .................. 2011-035061

(51) Int. Cl.
| B65G 37/00 | (2006.01) |
| B65G 13/02 | (2006.01) |
| B65H 5/06  | (2006.01) |
| B65H 29/12 | (2006.01) |

(52) U.S. Cl.
CPC ............... B65G 13/02 (2013.01); B65H 5/062 (2013.01); *B65H 2402/545* (2013.01); *B65H 2404/144* (2013.01); B65H 29/125 (2013.01); *B65H 2404/174* (2013.01)

(58) Field of Classification Search
CPC ............... B65H 5/062; B65H 2404/14; B65H 2401/143; B65H 2515/34
USPC ............. 198/608, 624, 626.4; 271/10.09, 21, 271/109, 304, 72, 314
See application file for complete search history.

(56) References Cited

U.S. PATENT DOCUMENTS

| 4,619,451 A * | 10/1986 | Dodge ......................... 271/274 |
| 4,826,383 A * | 5/1989  | Millen ......................... 198/624 |
| 5,673,910 A * | 10/1997 | Wamsley ..................... 271/259 |
| 5,762,332 A * | 6/1998  | Haroutel et al. ............. 271/274 |
| 7,523,933 B2 * | 4/2009 | Linder et al. ................. 271/274 |
| 8,517,166 B2 * | 8/2013 | Jost et al. ...................... 198/624 |
| 2004/0187712 A1 * | 9/2004 | Ledinek et al. ............. 198/624 |
| 2007/0210512 A1 * | 9/2007 | Sakakibara et al. .......... 271/314 |

FOREIGN PATENT DOCUMENTS

| JP | 1-150651 A   | 6/1989 |
| JP | 8-2734 A     | 1/1996 |
| JP | 9-067042 A   | 3/1997 |
| JP | 2003-063685 A | 3/2003 |
| JP | 2009-053994 A | 3/2009 |

* cited by examiner

*Primary Examiner* — James R Bidwell
(74) *Attorney, Agent, or Firm* — Rabin & Berdo, P.C.

(57) ABSTRACT

The present invention may lower the cost, save space and simplify assembly in a medium conveyance mechanism that conveys a medium with a pair of conveyance rollers provided facing each other. Namely, the medium conveyance mechanism is disposed with a torsion spring including a coil portion and arms at both ends of the coil portion; a first fixing wall that fixes one arm of the torsion spring; and a second fixing wall that fixes the coil portion at an opposite side from the first fixing wall, wherein the other arm of the torsion spring is made to contact a following roller shaft at the first fixing wall side.

5 Claims, 7 Drawing Sheets

MEDIUM CONVEYANCE MECHANISM

TECHNICAL FIELD

The present invention relates to a medium conveyance mechanism that conveys a medium such as sheet paper, booklets, or card by a pair of conveyance rollers.

BACKGROUND ART

Figure 7:
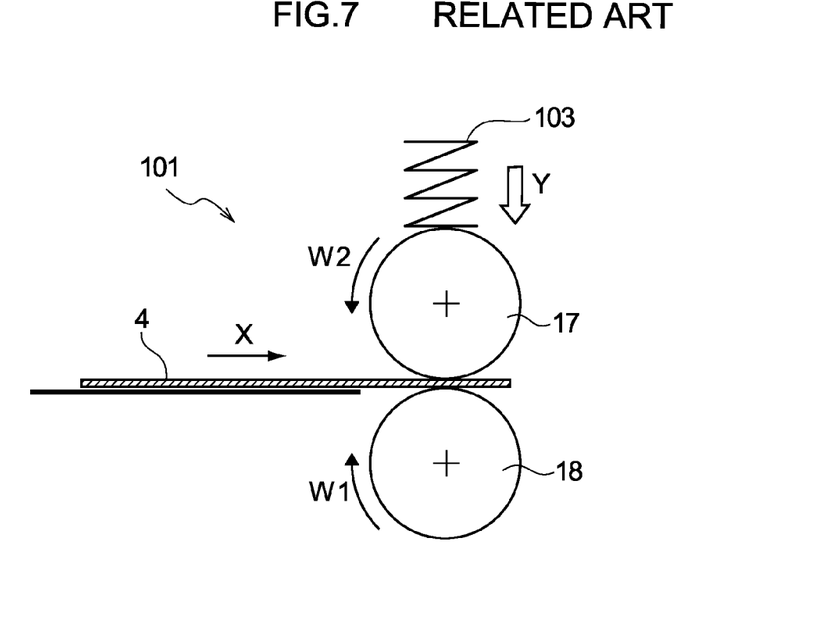
FIG. 7 is a configuration and explanatory operation diagram of a conventional medium conveyance mechanism.

Generally, as illustrated in FIG. 7, a medium conveyance mechanism 101 conveys a gripped medium 4 as illustrated by arrow X, by disposing a drive roller 18 and a following roller 17, disposed at a position facing the drive roller 18, as a pair of conveyance rollers, rotating the drive roller 18 in a W1 direction by a power source (not illustrated), and dragging the following roller 17 around in a W2 direction.

Further, the following roller 17 includes a pressing mechanism that presses, by a spring 103, as illustrated by arrow Y, in order to accommodate changes in the thickness of the gripped medium 4.

As a pressing mechanisms, a pressing mechanism configured by a compression spring that presses a shaft of the following roller 17 (see for example Japanese Patent Application Laid-Open (JP-A) No. 9-67042), a pressing mechanism configured by fixing a plate spring by a screw that presses against the shaft of the following roller 17 (see for example JP-A No. 1-150651), or a pressing mechanism wherein a pivot shaft is passed through a coil portion of a torsion spring and one arm of the torsion spring is fixed whilst the other arm presses the shaft of the following roller 17 (see for example JP-A No. 8-2734) exists.

DISCLOSURE OF INVENTION

Technical Problem

However, in the above conventional pressing mechanism using a compression spring, spring is low cost and is capable of being mounted in a narrow space. However, in the above pressing mechanism, a lid for holding down from above in order to fix the compression spring becomes necessary, increasing the number of components and the number of assembly processes.

Further, the above conventional pressing mechanism using a plate spring may press the shaft with a single plate spring, and is of simple assembly. However, plate springs have a higher cost than other springs. Moreover, in order to stabilize tension, in plate springs, it is also necessary to lengthen the plate spring to reduce the amplitude of tension vibration, thereby increasing the mounting space.

Further, the above conventional pressing mechanism using a torsion spring may press the shaft with a single spring and is of low cost. However, there is a need to pass a shaft through the pivot point of the torsion spring. Therefore, assembly of the pressing mechanism described above is difficult, as there is a need to pass a shaft through the coil portion whilst fixing the arm of the torsion spring.

As described above, in the conventional medium conveyance mechanism pressing mechanisms, it has not been possible to fulfill all of the conditions of being low cost, being capable of saving space, and being of simple assembly.

Solution to Problem

A first aspect of the present invention is a medium conveyance mechanism A medium conveyance mechanism that conveys a medium with a pair of conveyance rollers provided facing each other, the medium conveyance mechanism is disposed with: a torsion spring including a coil portion and arms at both ends of the coil portion; a first fixing wall that fixes one arm of the torsion spring; and a second fixing wall that fixes the coil portion at an opposite side from the first fixing wall, wherein the other arm of the torsion spring is made to contact a shaft of the one of conveyance rollers at the first fixing wall side.

Advantageous Effects of Invention

By configuring as described above, the medium conveyance mechanism according to the above aspects of the present invention may achieve low cost, may be capable of saving space, and may be of simple assembly.

BEST MODE FOR CARRYING OUT THE INVENTION

Explanation follows regarding exemplary embodiments of the present invention with reference to the drawings. Common elements in the drawings are allocated with the same reference numerals.

First Exemplary Embodiment

Figure 1:
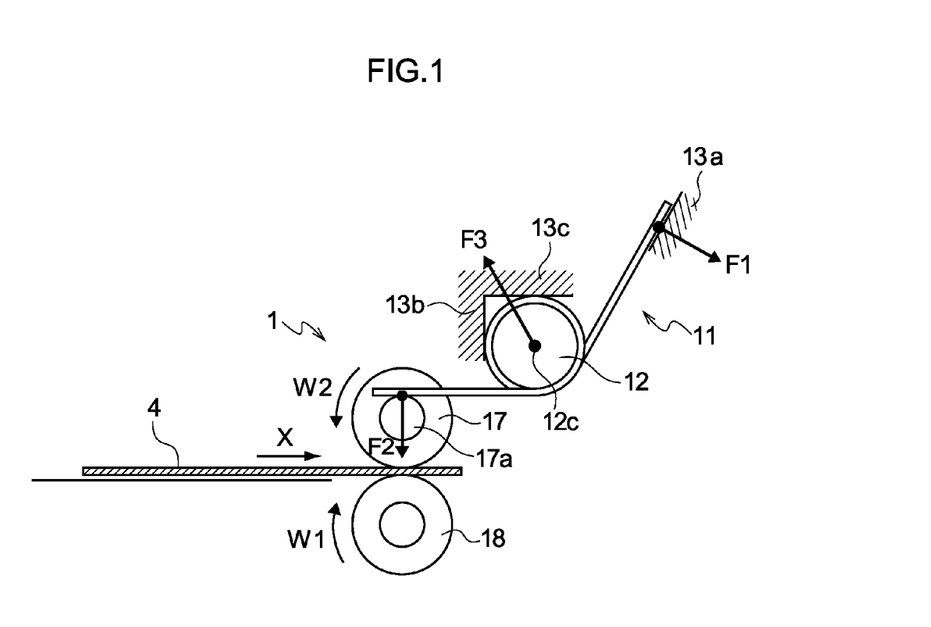
FIG. 1 is a configuration diagram of a medium conveyance mechanism of a first exemplary embodiment.

FIG. 1 is a configuration diagram showing a medium conveyance mechanism 1 of a first exemplary embodiment. As illustrated in FIG. 1, similarly to a conventional medium conveyance mechanism, the medium conveyance mechanism 1 of the first exemplary embodiment conveys a gripped medium 4 as arrow X, by disposing a drive roller 18 and a following roller 17, disposed at a position facing the drive roller 18, as a pair of conveyance rollers, rotating the drive roller 18 in a W1 direction by a power source (not illustrated), and dragging the following roller 17 around in a W2 direction.

Further, the medium conveyance mechanism 1 of the first exemplary embodiment is configured by disposing, a torsion spring 11 including a coil portion 12 and arms at both ends thereof, a fixing wall A (13a) as a first fixing wall that fixes one of the arms of the torsion spring 11, and a fixing wall B (13b) and fixing wall C (13c) as second fixing walls that fix the coil portion 12, and by contacting the other arm of the torsion spring 11 to a following roller shaft 17a of the following roller 17.

Accordingly, the medium conveyance mechanism 1 of the first exemplary embodiment does not require a shaft to fix the torsion spring 11. Further, as described in detail later, an external force F1 towards the fixing wall A (13a), an external force F2 towards the following roller shaft 17a, and an external force F3 towards the fixing wall B (13b) and the fixing wall C (13c) are configured so as to balance with each other.

By the above configuration, the medium conveyance mechanism 1 of the first exemplary embodiment operates as follows. This operation is explained in detail below by using the explanatory operation diagram of FIG. 2.

Figure 2:
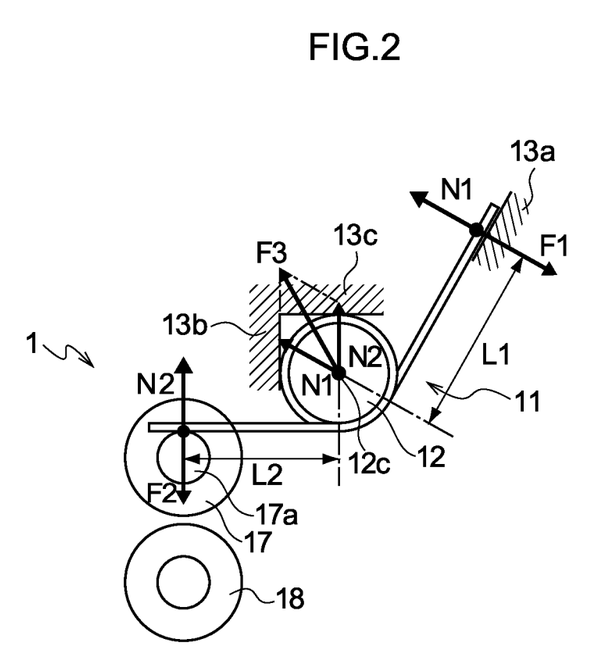
FIG. 2 is an explanatory operation diagram of a medium conveyance mechanism of the first exemplary embodiment.

The torsion spring 11 is attached by: fitting the coil portion 12 of the torsion spring 11 into the fixing wall B (13b) and the fixing wall C (13c); next, contacting the one arm of the torsion spring 11 with the fixing wall A (13a); and finally, contacting the other arm of the torsion spring 11 with the following roller shaft 17a. At this time, although not illustrated, in the torsion spring 11, a specific deformation angle θ from the free angle of the torsion spring 11 is generated.

Note that configuration may be made such that the coil portion 12 of the torsion spring 11 is fitted into the fixing wall B (13b) and the fixing wall C (13c) after the one arm of the torsion spring 11 has been made to contact the fixing wall A (13a).

Accordingly, the external force F1 at a position of the fixing wall A (13a) and the external force F2 at a position on the following roller shaft 17a are generated according to the deformation angle θ and arm lengths L1, L2 of the torsion spring 11.

Further, N1 is generated at the fixing wall A (13a) as a reaction force against the external force F1, and N2 is generated at the following roller shaft 17a as a reaction force against the external force F2. The compound of these reaction forces N1+N2 becomes the external force F3 to the fixing wall B (13b) and the fixing wall C (13c) at a hypothetical pivot position 12c of the coil portion 12 of the torsion spring 11. Further, these external forces balance with each other, in the relationship F3=F1+F2.

Figure 3A:
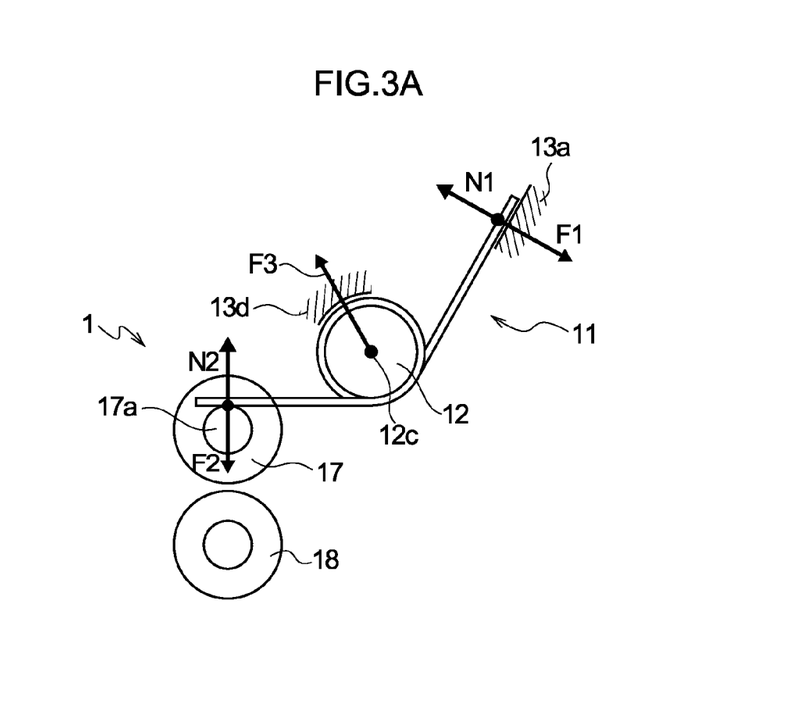
FIG. 3A is a configuration and explanatory operation diagram of a modified example of a medium conveyance mechanism of the first exemplary embodiment.
Figure 3B:
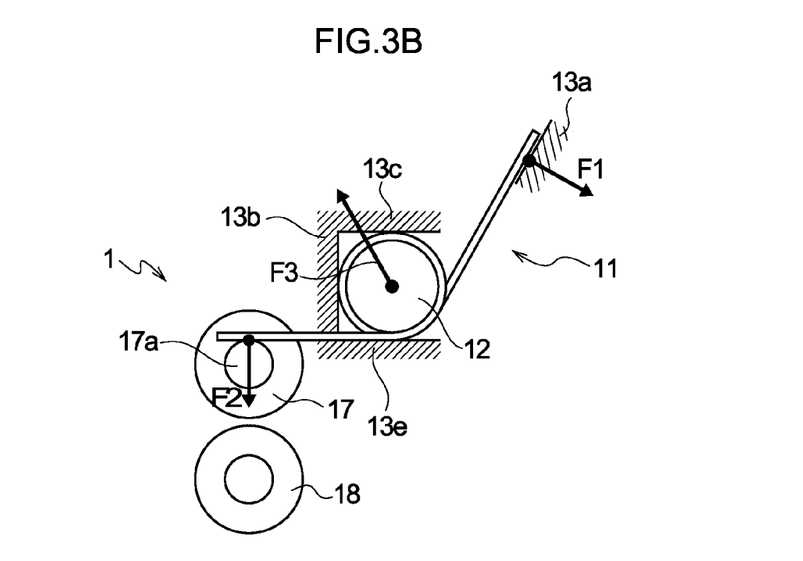
FIG. 3B is a configuration and explanatory operation diagram of modified example of a medium conveyance mechanism of the first exemplary embodiment.

Note that, in the above explanation of the first exemplary embodiment, explanation has been given wherein the fixing wall B (13b) and the fixing wall C (13c) are provided as the second solid wall, and the coil portion 12 of the torsion spring 11 fitted into and fixed thereto. However, as illustrated in FIG. 3A, a circular arc shaped fixing wall D (13d) that contacts a portion of the outer diameter of the coil portion 12 of the torsion spring 11 may be provided as the second solid wall. Further, as illustrated in FIG. 3B, a fixing wall E (13e) may be provided in addition to the fixing wall B (13b) and the fixing wall C (13c), with these configuring the second solid wall.

Moreover, in the above explanation of the first exemplary embodiment, explanation has been given wherein the second solid wall is configured from fixing walls at an angle of about 90°. However, fixing walls may be configured with more flat faces having angles in excess of 90°, with the coil portion 12 made to contact each of the faces.

As described above, according to the medium conveyance mechanism of the first exemplary embodiment, in a medium conveyance mechanism that conveys a medium with a pair of conveyance rollers provided facing each other, the medium conveyance mechanism is disposed with: a torsion spring including a coil portion and arms at both ends of the coil portion; a first fixing wall that fixes one arm of the torsion spring; and a second fixing wall that fixes the coil portion at an opposite side from the first fixing wall, wherein the other arm of the torsion spring is made to contact a shaft of the one of conveyance rollers at the first fixing wall side. Accordingly, the medium conveyance mechanism of the first exemplary embodiment is low-cost, may save space, and may be assembled simply.

Second Exemplary Embodiment

Figure 4:
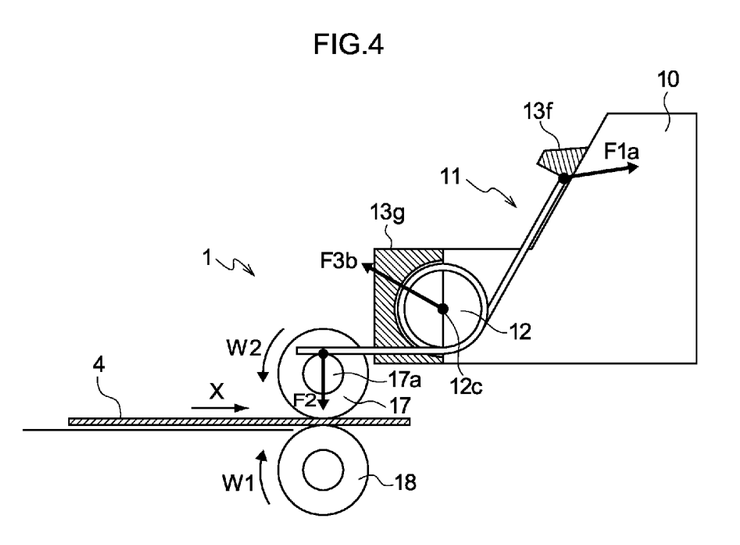
FIG. 4 is a configuration diagram of a medium conveyance mechanism of a second exemplary embodiment.

FIG. 4 illustrates a configuration diagram of a medium conveyance mechanism 1 of the second exemplary embodiment. As illustrated in FIG. 4, the medium conveyance mechanism 1 of the second exemplary embodiment is configured with a housing 10 in which a fixing wall F (13f) serving as a first fixing wall that fixes one arm of a torsion spring 11 and has an edge shape at the torsion spring 11 side and a sloping shape at the opposite side to the torsion spring 11 side, and a fixing wall G (13g) serving as a second fixing wall into which coil portions 12 of the torsion spring 11 are fitted and fixed, are provided.

Accordingly, similar to the medium conveyance mechanism of the first exemplary embodiment, the medium conveyance mechanism 1 of the second exemplary embodiment does not require a shaft to fix the torsion spring 11. Further, as described in detail later, in the second exemplary embodiment, an external force F1a towards the fixing wall F (13f), an external force F2 towards a following roller shaft 17a, and an external force F3b towards the fixing wall G (13g) are balanced to each other. Other configuration of the second exemplary embodiment is similar to that of the medium conveyance mechanism of the first exemplary embodiment, and therefore, detailed explanation thereof will be omitted for simplicity.

By the above configuration, the medium conveyance mechanism 1 of the second exemplary embodiment operates as described below. This operation is explained in detail below, with reference to the assembly diagram of FIG. 5 and the explanatory operation diagrams FIG. 6A and FIG. 6B.

The sequence for mounting the torsion spring 11 to the housing 10 is as follows. Firstly, as illustrated in the perspective view of FIG. 5 and the cross-section of FIG. 6A, the coil portions 12 of the torsion spring 11 are fitted (broken line a) into the fixing wall G (13g) of the housing 10. Next, a coupling portion 11a of the torsion spring 11 is pushed against an upper portion of the fixing wall F (13f), and then pushed in (broken line b) towards the lower side as illustrated by arrow A, thereby assembling the housing 10.

Figure 6A:
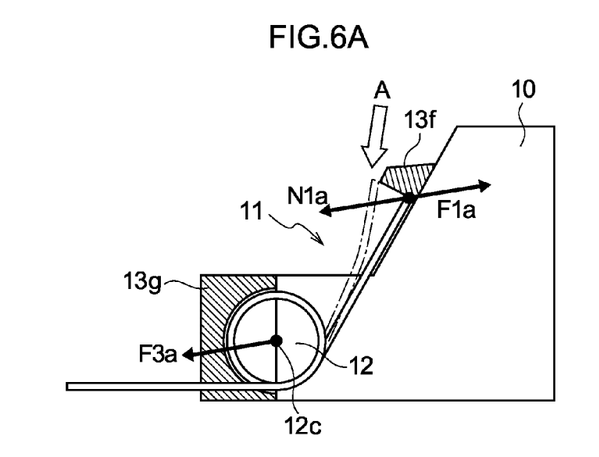
FIG. 6A is an explanatory operation diagram of a medium conveyance mechanism of the second exemplary embodiment.

At this time, as illustrated in FIG. 6A, an external force towards the fixing wall F (13f) is generated in a diagonally upwards direction, as illustrated by arrow F1a, since the coupling portion 11a of the torsion spring 11 is pushed and attached to the fixing wall F (13f). On the other hand, a reaction force N1a is generated from the fixing wall F (13f). Then, at the fixing wall G (13g), the reaction force N1a is applied as the external force F3, and balances with each other by becoming F3a=F1a.

Figure 5:
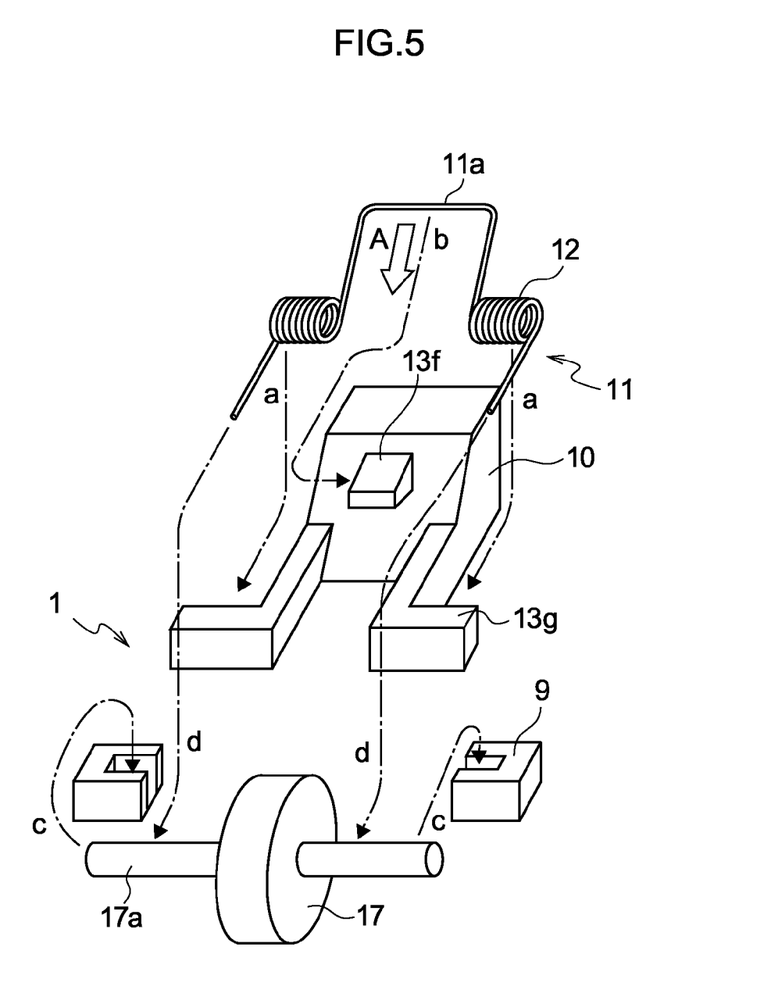
FIG. 5 is an assembly diagram of a medium conveyance mechanism of the second exemplary embodiment.

Next, the following roller shaft 17a of the following roller 17 is fitted into shaft bearers 9 that are attached (broken line c) to an attachment platform (not illustrated).

Then, the housing 10 assembled as described above is mounted to the shaft bearer 9 attachment platform (not illustrated) such that the other arms of the torsion spring 11 contact the following roller shaft 17a (broken line d).

Figure 6B:
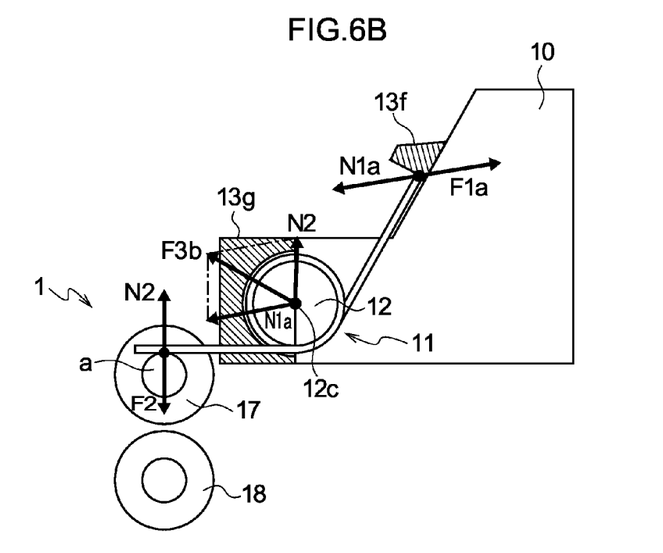
FIG. 6B is an explanatory operation diagram of a medium conveyance mechanism of the second exemplary embodiment.

Then, as illustrated in FIG. 6B, the external force F2 is generated at the position of the following roller shaft 17a due to stress, not illustrated, arising from the deformation angle θ away from the free angle of the torsion spring 11, and N2 is generated in reaction thereto.

Further, a reaction force of the compound N1a+N2 is generated at the fixing wall G (13g) as an external force F3b at a hypothetical pivot position 12c of the coil portions 12 of the torsion spring 11. These external forces balances with each other in a relationship of F3b=F1a+F2.

Note that, in the above explanation of the second exemplary embodiment, explanation has been given of an example wherein the torsion spring 11 is a double torsion spring with two coil portions provided as the coil portions 12. However, the coil portion 12 may have a single coil portion, or may have three or more coil portions.

Further, explanation has been given of an example where one arm of the two coil portions are respectively coupled together by the coupling portion 11a as the torsion spring 11. However, two torsion springs may be respectively mounted to the housing 10 without providing the coupling portion 11a.

As described above, in the medium conveyance mechanism of the second exemplary embodiment, the first fixing wall that fixes the one arm of the torsion spring and the second fixing wall that fixes the coil portion at the opposite side to the first fixing wall are provided to the housing. Accordingly, the medium conveyance mechanism of the second exemplary embodiment may be assembled even more simply, in addition to the effects of the first exemplary embodiment.

Other Exemplary Embodiments

In the explanation of the above exemplary embodiments, explanation has been given where one arm of the torsion spring 11 is made to contact the following roller shaft 12a of the following roller 12. However, the one arm of the torsion spring 11 may be made to contact the shaft of the drive roller 18. Moreover, configuration may be made by providing two torsion springs 11 and contacting the one arms of the torsion springs 11 to the shafts of the following roller 12 and the drive roller 18.

As described above, the present invention may be widely used in medium processing apparatuses including a medium conveyance mechanism that conveys a medium, such as sheet paper, booklets, or card, by a pair of conveyance rollers.

The disclosure of Japanese Patent Application No. 2011-035061 is incorporated by reference in its entirety in the present specification.

All cited documents, patent applications and technical standards mentioned in the present specification are incorporated by reference in the present specification to the same extent as if the individual cited document, patent application, or technical standard was specifically and individually indicated to be incorporated by reference.

The invention claimed is:

1. A medium conveyance mechanism that conveys a medium with a pair of conveyance rollers provided facing each other, the medium conveyance mechanism comprising:
    a torsion spring including a coil portion and arms at both ends of the coil portion;
    a first fixing wall that fixes one arm of the torsion spring;
    a second fixing wall that fixes the coil portion at an opposite side from the first fixing wall; and
    a housing at which the first fixing wall and the second fixing wall are provided;
    wherein the other arm of the torsion spring is made to contact a shaft of the one of conveyance rollers at the first fixing wall side; and
    wherein the first fixing wall is formed in an edge shape at the torsion spring side, and in a sloping shape at the opposite side from the torsion spring side.

2. The medium conveyance mechanism of claim 1, wherein the second fixing wall is a combination of flat faces that contact the coil portion at a plurality of locations, or is formed in a circular arc shape that contacts a portion of the outer diameter of the coil portion.

3. A medium conveyance mechanism that conveys a medium with a pair of conveyance rollers provided facing each other, the medium conveyance mechanism comprising:
    a torsion spring including a coil portion and arms at both ends of the coil portion;
    a first fixing wall that fixes one arm of the torsion spring; and
    a second fixing wall that fixes the coil portion at an opposite side from the first fixing wall;
    wherein the other arm of the torsion spring is made to contact a shaft of the one of conveyance rollers at the first fixing wall side; and
    wherein the torsion spring is a double torsion spring including two of the coil portions that each have one arm coupled together by a coupling portion.

4. The medium conveyance mechanism of claim 3, further comprising a housing at which the first fixing wall and the second fixing wall are provided.

5. The medium conveyance mechanism of claim 3, wherein the second fixing wall is a combination of flat faces that contact the coil portion at a plurality of locations, or is formed in a circular arc shape that contacts a portion of the outer diameter of the coil portion.

* * * * *